Nov. 26, 1929.  F. F. STARR  1,736,865
ELECTRICAL GENERATING SYSTEM
Filed Aug. 3, 1925  2 Sheets-Sheet 1

Inventor
Frank F. Starr
By Spencer Sewall & Hardman
his Attorneys

Nov. 26, 1929.   F. F. STARR   1,736,865
ELECTRICAL GENERATING SYSTEM
Filed Aug. 3, 1925   2 Sheets-Sheet 2

Inventor
Frank F Starr
By Spencer Sewall & Hardman
his Attorneys

Patented Nov. 26, 1929

1,736,865

UNITED STATES PATENT OFFICE

FRANK F. STARR, OF DAYTON, OHIO, ASSIGNOR TO DELCO-LIGHT COMPANY, OF DAYTON, OHIO, A CORPORATION OF DELAWARE

ELECTRICAL GENERATING SYSTEM

Application filed August 3, 1925. Serial No. 47,717.

This invention relates to electrical generating apparatus of the type wherein an internal-combustion engine drives a generator, for the purpose of supplying current to a storage battery, or other electrical apparatus, such as electric lamps and motors.

One of the objects of the present invention is to provide at low cost improved apparatus for starting the engine automatically in response to a demand for current, and for causing the engine to stop automatically when the demand ceases.

In carrying out this object, I provide a relatively low-voltage motor for starting the engine, and a correspondingly low-voltage battery for operating the starting motor. The battery is charged by the generator, which may be of higher voltage. The motor is normally disengaged from the engine, but is automatically connected therewith by means responsive to the demand for current. The motor is mechanically disconnected from the engine and electrically disconnected from the battery by means responsive to the operation of the engine.

Further objects and advantages of the present invention will be apparent from the following description, reference being had to the accompanying drawings, wherein a preferred form of the present invention is clearly shown.

Figure 4:
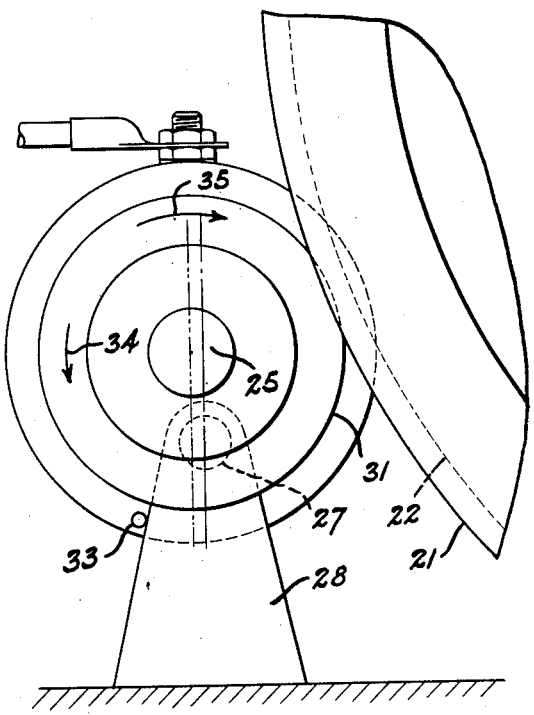
Figs. 4 and 5 are end views of the starting motor, shown with a portion of the engine flywheel, the motor being disengaged from the flywheel in Fig. 4 and engaged with the flywheel in Fig. 5.
Figure 2:
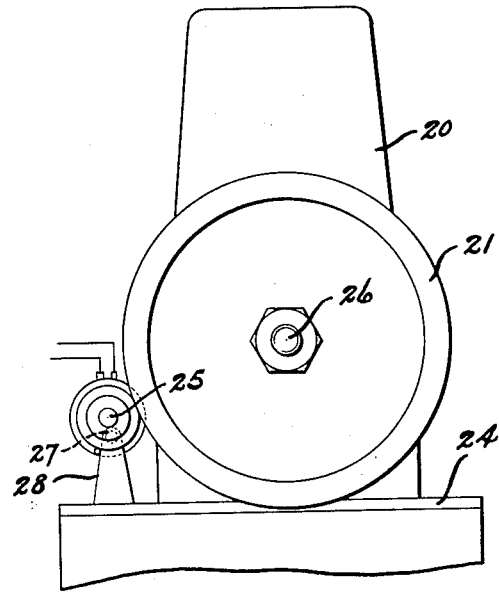
Fig. 2 is an end view of the internal-combustion engine and starting motor shown diagrammatically in Fig. 1.
Figure 3:
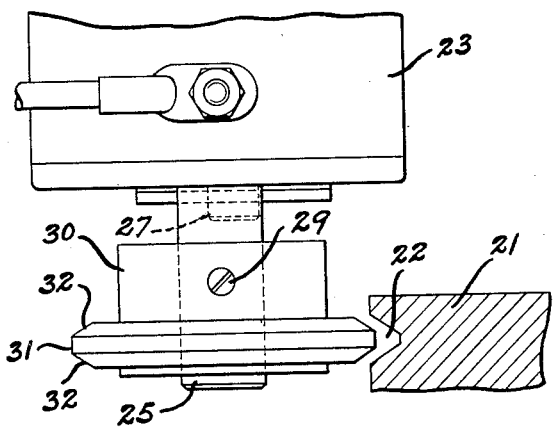
Fig. 3 is a view on a larger scale than Fig. 2, showing a fragmentary plan view of the starting motor, and a fragmentary sectional view of the engine flywheel.
Figure 5:
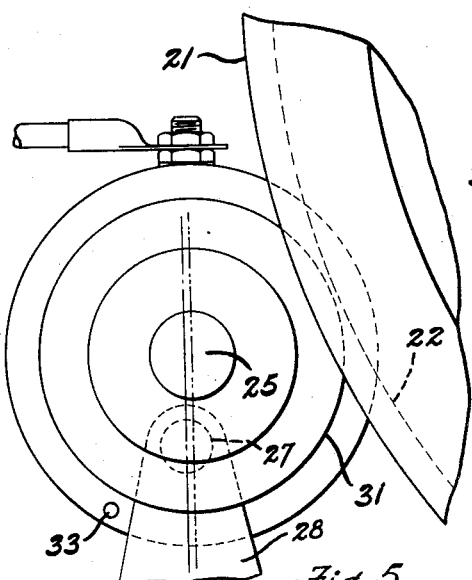

Referring to the drawing, 20 designates an internal-combustion engine having a preferably cast-iron flywheel 21 provided with a groove 22, shown more clearly in Fig. 3. The angle made by the sides of the groove is preferably about 56°, although there may be considerable variation from this angle. A small, low-voltage motor 23 is mounted upon the engine base 24, with its shaft 25 parallel to the engine shaft 26. The frame of the motor carries trunnions 27 which are eccentric to and are located below the shaft 25. The trunnions 27 are supported by a bracket 28. A screw 29 attaches to the shaft 25 a metal hub 30 supporting a friction wheel 31 having conical surfaces 32, which make an angle with one another equal to the angle between the sides of the groove 22. Normally, the axis of shaft 25 is located, as shown in Fig. 4, with respect to the flywheel 21 and to the axis of the trunnions 27. The pulley 31 is out of engagement with the flywheel, and the vertical center line of the axis of shaft 25 is to the left of the vertical center line of the axis of trunnions 27. Counterclockwise rotation of the shaft 25 about the trunnions 27 is limited by a stop pin 33 carried by the frame of the motor engaging the bracket 28. When the motor is connected with a source of current, such as the battery 40, shown in Fig. 1, it operates in a counterclockwise direction, as indicated by the arrow 34 in Fig. 4. The reaction of the motor field magnets with respect to the motor armature causes the motor frame to tend to rotate in a clockwise direction with respect to the armature. Therefore, the frame will move in the direction of the arrow 35, about the axis of the trunnions 27. The disc 31 will, therefore, move into engagement with the flywheel 21, as shown in Fig. 5, and will frictionally engage the flywheel, so that the motor will crank the engine. When the engine becomes self-operative, it will tend to throw the motor wheel 31 out of engagement with the flywheel 21. If the motor is not disconnected from a source of current, it will remain in engagement with the engine flywheel. Therefore, in the present invention the disconnection of the motor from a source of current is made to depend upon the engine becoming self-operative and obtaining such a speed as to assure the continuous operation of the engine, as contrasted with a false start.

The engine 20 operates a generator 41 having a shunt field 42, a series field 43, and terminals 44, 45 and 46. In a manner to be explained, the generator supplies current to the battery 40 and to a work or load circuit including one or more electrical translation devices 47, each of which may have a separate control switch 48.

Ignition for the engine is provided by ignition apparatus including an ignition coil having a primary winding 50 which is connected with an ignition timer 51 and with a battery 40 in a manner to be explained. The coil includes a secondary winding 52 having one end connected with a spark plug 53 and the other end grounded upon the engine frame.

The power plant is started by closing one of the switches 48, thereby causing current to flow from the battery 40 through a relatively high-resistance magnet winding 61 through the following circuit: battery 40, wire 54, wire 55, winding 61, low-resistance magnetic winding 99, wire 56, switch 48, device 47, rheostat 57, wire 58 to battery 40. When the winding 61 is energized, it will attract an armature 62, thereby moving a contact 63 into engagement with a contact 64. This operation connects the ignition coil 50 and timer 51 with the battery 40 in the following manner: wire 54, wire 65, contacts 63 and 64, wire 66, contact 67, contact 68, wire 69, wire 70, ignition coil primary 50, timer 51 and wire 71.

The closing of contacts 63 and 64 connects the battery 40 with a magnet winding 72 for controlling the starting switch through the following circuit: battery 40, wire 54, wire 65, contacts 63 and 64, wire 66, contacts 67 and 68, wire 69, contact 73, contact 74, contact 75, wire 76, magnet winding 72, wire 78 and wire 58. The energizing of winding 72 will attract an armature 79 in order to move a switch contact 80 which is pivoted at 81 into engagement with a contact 82. This operation will connect the battery 40 with the starting motor 23 through the following circuit, which can be easily traced by referring to the heavy black lines: battery 40, wire 54, terminal 83, thermostat blade 84, wire 85, contact 80, contact 82, wire 86, motor 23 and wire 71. The motor disc 31 will move into engagement with the engine flywheel 21 and the motor will operate to crank the engine.

Figure 1:
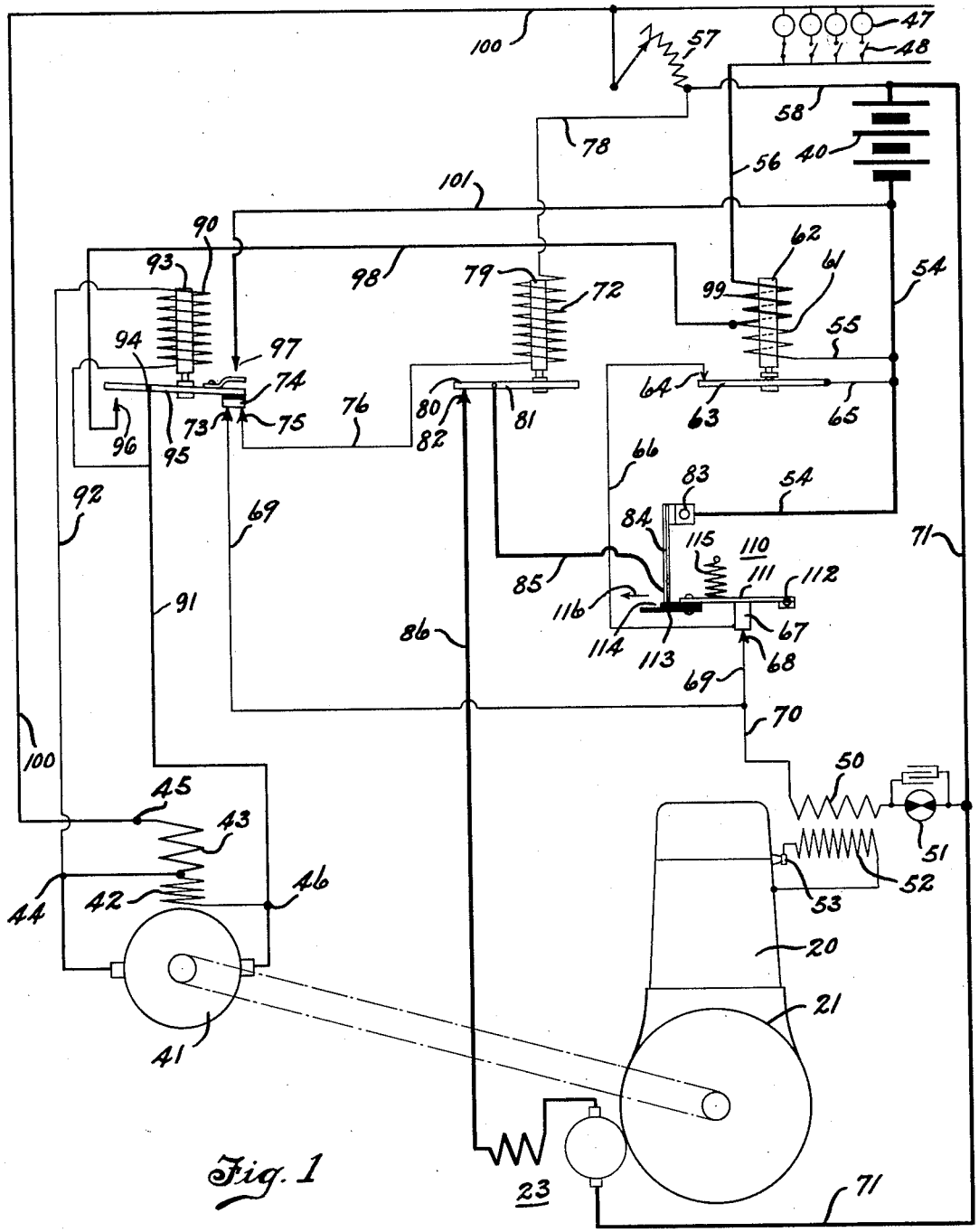
Fig. 1 is a wiring diagram, illustrating the invention.

The generator 41 is not connected with the load circuit or with the battery, and the starting motor is not disconnected from the battery, until the voltage of the generator has attained a certain value. The mechanism for controlling the circuits just referred to, includes a magnet winding 90 which is connected by wire 91 with terminal 46 of the generator 41, and by wire 92 with terminal 44. When the voltage across the terminals 44 and 46, has reached a certain value, the magnet winding 90 will attract the armature 93, which is pivoted at terminal 94, and will cause a contact 95 to move into engagement with contacts 96 and 97, and will move the contact 74 out of engagement with the contacts 73 and 75. The separation of contact 74 from contacts 73 and 75, will interrupt the circuit to the starting switch magnet winding 72, thereby permitting the contact 80 to become separated from the contact 82. Thus, the motor 23 will be disconnected from the battery 40 and will be mechanically disengaged from the engine. The operation of armature 93 causes contact 95 to engage contact 97 an instant before contact 95 engages contact 96. The engagement of contacts 95 and 97 connects the generator 41 with the battery 40 for the purpose of charging the same. The circuit is as follow: terminal 46, wire 91, terminal 94, contact 95, contact 97, wire 101, battery 40, wire 58, rheostat 57, wire 100 and terminal 45. As the battery 40 is preferably of lower voltage than the generator 41, the rheostat 57 is adjusted so that the battery will be charged at the proper rate. For example, the generator may be wound for 32 volts, while the battery may be a three-cell, six-volt battery, such as used to a large extent in automobiles. Current will also flow in the circuit including wires 54 and 55, high-resistance winding 61, low-resistance winding 99, wire 56, switch 48, device 47 and wire 100, which circuit is in parallel with the battery, and the current flow in winding 61 is in the same direction as the current flow when the winding is energized initially by the battery. The closing of contacts 95 and 96 causes the generator 41 to be connected with the load circuit in the following manner: terminal 46, wire 91, terminal 94, contact 95, contact 96, wire 98, magnet winding 99, wire 56, device 47, wire 100 and terminal 45. The load circuit and the battery-charging circuit are indicated in Fig. 1 by the circuit lines which are of medium width. If contact 95 engages contact 96 before engaging contact 97, current flow would reverse in winding 61 and magnetically oppose winding 99, which may cause armature 62 to fall out. Therefore, it is desirable that contact 95 should engage contact 97 before engaging contact 96. The engagement of contact 95 with contacts 96 and 97, causes the high-resistance winding 61 to be short-circuited, and the low-resistance winding 99 to be connected in series with the load circuit. In this manner, the ignition circuit switch contacts 63 and 64 are maintained in engagement, although the circuit of the magnet winding 72, controlling the starting switch, has been broken. Therefore, as long as there is a demand for current in the work circuit, the ignition circuit will be maintained. But, when all of the switches 48 are open so that no current will flow through the winding 99, the contact 63 will move, by gravity, away from the contact 64 to break the ignition circuit, thereby stopping the engine. When the engine speed falls below a certain value, the current in the magnet winding 90 will be insufficient to maintain the contact 95 in engagement with the contacts 96 and 97, and the generator 41 will be disconnected from the load circuit and from the battery. Therefore, the battery cannot discharge back to the generator.

In order to prevent excessive discharge of the battery through the starting motor, a cranking cutout 110 is provided. This cutout includes the thermostat blade 84 in the engine-cranking circuit, and the contacts 67 and 68, which have been referred to. The contact 68 is stationary, while the contact 67 is attached to a lever 111, which is pivoted at 112. Lever 111 carries a non-conducting block 113 having a notch 114. A spring 115 tends to move the lever 111 upwardly, so that the block 113 is pressed against the lower end of the thermostat blade 84. If the engine should fail to start within a reasonable time, the bimetallic blade 84 will become heated sufficiently, due to the passage of cranking current through it, to move in the direction of the arrow 116, so that its free end may be received by the notch 114 of the block 113. When this occurs, the spring 115 will be released to move the lever 111 upwardly and separate contact 67 from contact 68. This operation will cause the ignition coil to be disconnected from the battery, and the circuit to the starting switch magnet winding 72 to be interrupted. The cranking of the engine will cease and the ignition circuit will be broken, so that no further discharge of the battery will take place.

While the form of embodiment of the invention as herein disclosed, constitutes a preferred form. it is to be understood that other forms might be adopted, all coming within the scope of the claims which follow.

What is claimed is as follows:

1. Electrical generating apparatus comprising, in combination, an internal-combustion engine, a generator driven thereby, a relatively low-voltage electric motor for starting the engine, a correspondingly low-voltage storage battery for operating the motor, low-voltage engine ignition apparatus operated by the battery, a load circuit including electrical translation devices, a switch for connecting the battery and ignition apparatus, a magnet winding, a circuit including said magnet winding, said battery, and said translation devices energized by the battery in response to demand for current in the load circuit for closing the ignition switch, said second circuit being maintained closed throughout the operation of the apparatus, a second magnet winding for maintaining said switch closed, means responsive to the closing of the ignition switch for causing the battery to be connected with the motor, and means responsive to engine operation for causing the battery to be disconnected from the motor and the first magnet winding to be short-circuited and for causing said second magnet winding to be connected in the load circuit for maintaining the ignition switch closed while there is a demand for current.

2. Electrical generating apparatus comprising, in combination, an internal-combustion engine, a generator driven thereby, a relatively low-voltage electric motor for starting the engine, a correspondingly low-voltage storage battery for operating the motor, low-voltage engine ignition apparatus operated by the battery, a load circuit including electrical translation devices, a normally-open switch for controlling the connection of the battery and motor and battery and ignition apparatus, a normally-closed switch for controlling the connection of the battery and motor, a magnet winding, a circuit including said magnet winding, said battery, and said translation devices energized by the battery in response to demand for current in the load circuit for closing the first switch, said second circuit being maintained closed throughout the operation of the apparatus, a second magnet winding for maintaining the first switch closed, and means responsive to engine operation for opening the second switch and for connecting the generator with the load circuit and the second magnet winding and the battery with the generator, and for short-circuiting the first magnet winding.

3. Electrical generating apparatus comprising in combination, an engine, a generator driven thereby, an ignition circuit for the engine, a relatively low-voltage electric motor for starting the engine, a correspondingly low-voltage battery for operating the motor, high voltage service mains adapted to be energized by the generator, a switch for connecting the motor with the battery for starting the engine, a magnet winding for controlling said switch, a switch for controlling said magnet winding and for rendering the ignition circuit operative, a second magnet winding energized by the battery and operable in response to a demand for current from the generator for controlling the second switch, a circuit including said second magnet winding said battery, and said service mains, said second circuit being maintained closed throughout the operation of the apparatus, means responsive to engine operation for disconnecting the motor from the battery and for short circuiting said second magnet winding, and a magnet winding controlled by said engine responsive means for maintaining the ignition circuit operative.

4. Electrical generating apparatus. comprising in combination, an engine, a generator driven thereby, an ignition circuit for the engine, a relatively low-voltage electric motor for starting the engine, a correspondingly low-voltage battery for operating the motor, high voltage service mains adapted to be energized by the generator, a switch for connecting the motor with the battery for starting the engine, a magnet winding for controlling said switch, a switch for controlling said magnet winding and for rendering the ignition circuit operative, a second magnet winding energized by the battery and operable in response to a demand for current from the generator for controlling the second switch. a circuit including said second magnet winding said battery, and said service mains, said second circuit being maintained closed throughout the operation of the apparatus, means responsive to engine operation for disconnecting the motor from the battery and for connecting the generator with the service mains and for short circuiting said second magnet winding, and a magnet winding controlled by said engine responsive means for maintaining the ignition circuit operative.

5. Electrical generating apparatus, comprising in combination, an engine, a generator driven thereby, an ignition circuit for the engine, a relatively low-voltage electric motor for starting the engine, a correspondingly low-voltage battery for operating the motor, high-voltage service mains adapted to be energized by the generator, a switch for connecting the motor with the battery for starting the engine, a magnet winding for controlling said switch, a switch for controlling said magnet winding and for rendering the ignition circuit operative, a second magnet winding energized by the battery and operable in response to a demand for current from the generator for controlling the second switch, a circuit including said second magnet winding said battery, and said service mains, said second circuit being maintained closed throughout the operation of the apparatus, means responsive to engine operation for disconnecting the motor from the battery and for connecting the generator with the service mains and for short circuiting said second magnet winding, and a magnet winding arranged in series relation with the service main and generator for maintaining the ignition circuit operative.

6. Electrical generating apparatus, comprising in combination, an engine, a generator driven thereby, an ignition circuit for the engine, a relatively low-voltage electric motor for starting the engine, a correspondingly low-voltage battery for operating the motor, high-voltage service mains adapted to be energized by the generator, a switch for connecting the motor with the battery for starting the engine, a magnet winding for controlling said switch, a switch for controlling said magnet winding and for rendering the ignition circuit operative, a second magnet winding energized by the battery and operable in response to a demand for current from the generator for controlling the second switch, a circuit including said second magnet winding said battery, and said service mains, said second circuit being maintained closed throughout the operation of the apparatus, means responsive to engine operation for disconnecting the motor from the battery and for connecting the generator with the service mains and with the battery for charging the latter and for short circuiting said second magnet winding whereby to render said second magnet inoperative for controlling said ignition circuit, and a magnet winding arranged in series relation with the service main and generator for maintaining the ignition circuit operative.

7. Electrical generating apparatus, comprising in combination, a relatively high-voltage work circuit, a relatively low voltage battery, an engine, electrical apparatus connected with the engine for cranking the same and for supplying current to the work circuit and for charging the battery, a control circuit for the engine, means for connecting the electrical apparatus with the battery for cranking the engine when there is a demand for current in the work circuit and for controlling the engine control circuit, said means including a magnet winding, energized by the battery, a circuit including said magnet winding said battery and said work circuit, said third mentioned circuit being maintained closed throughout the operation of the apparatus, a second magnet winding for maintaining said control circuit as under the influence of the first winding, and means operable after the engine is self-operative for short circuiting the first magnet winding.

In testimony whereof I hereto affix my signature.

FRANK F. STARR.